Patented May 24, 1932

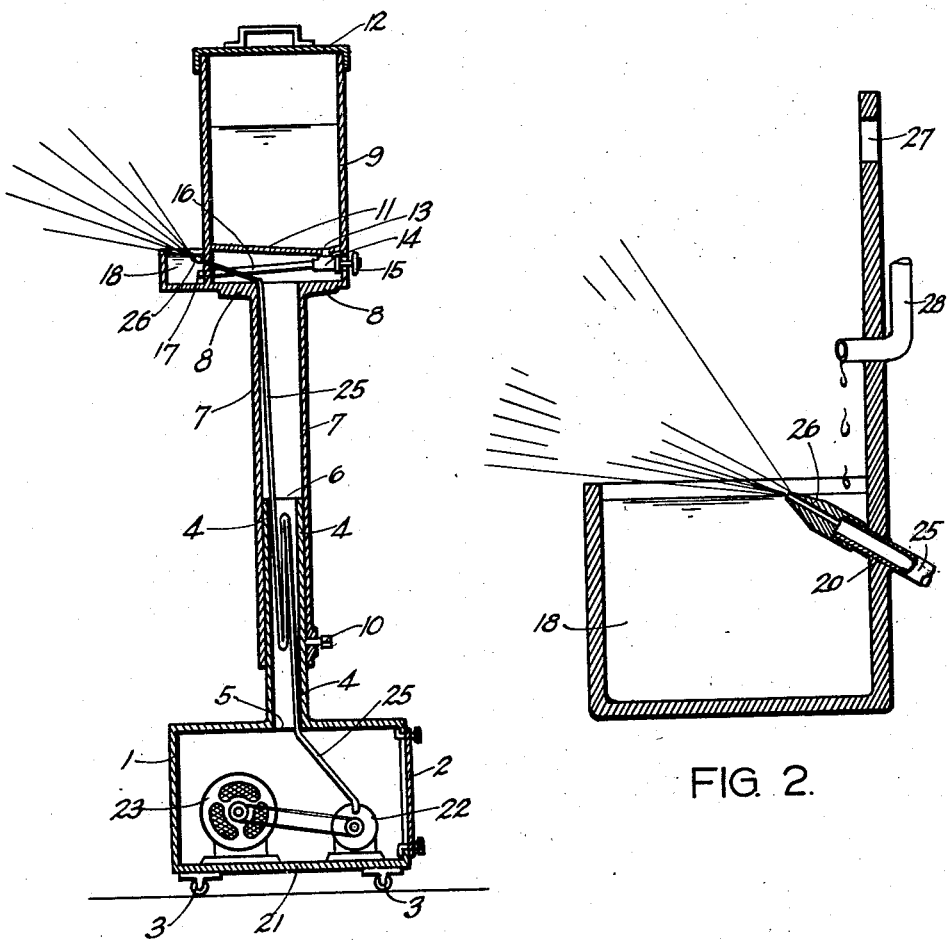

1,859,935

UNITED STATES PATENT OFFICE

LOYS C. POTTS AND OLIVER P. ROMINE, OF OKLAHOMA CITY, OKLAHOMA

PORTABLE APPARATUS FOR SPRAYING VEGETABLES

Application filed August 12, 1929. Serial No. 385,286.

Our invention relates to a portable means for creating and directing a vaporized spray of water upon a vegetable rack or the like.

The objects of our invention are to provide a device of this class which is new, novel, practical and of utility; which will be serviceable primarily to green grocers, florists, and the like; which will create a vaporized mist-like spray of water for the cooling of vegetables, fruits or cut flowers, and which will direct such spray as desired; a device which will be portable; which may readily be moved from place to place in or about a store; which in its preferred embodiment will contain its own water supply which may be furnished by buckets instead of a water supply system; which will eliminate the plumbing and water pipes incident to usual sprays; which will be adjustable in height in order that shelves or trays of varying heights may be sprayed; which will use but a small quantity of water; which will be relatively inexpensive in manufacture and in operation; which will be simple and durable; which will prevent the vegetables and the like from becoming water soaked, and becoming ruined thereby; which will be efficient in accomplishing all the purposes for which it is intended.

In so far as applicants know or can ascertain there are now no portable vegetable sprays available which may be moved from place to place within or without a store and so operated, free from attachment to a water tap. Such taps are not always available and even when available, are not always located at points best adapted to use with the usual spray. Usual devices provide a relatively heavy spray of water.

Being self contained, our portable spray may be readily positioned adjacent a vegetable rack or flower stand and moved as desired. No plumbing or water pipes are required. The spray from our device being delivered in a fine vaporized mist, is quite largely evaporated in the air. Such evaporation is attended by a cooling of the air. Fruits, vegetables and cut flowers are preserved longer under the vaporized mist than under the coarser spray.

With these and other objects in view as will more fully appear, our invention consists in the construction, novel features, and combination of parts hereinafter more fully described, pointed out in the claims hereto appended, and illustrated in the accompanying one-sheet drawings, of which Figure 1 is an elevational sectional view of one embodiment of the device;

Fig. 2 is a fragmentary elevational view of the spray nozzle and water trap as designed to hang from a support.

Like characters of reference designate like parts in all the figures.

It is understood that various changes in the form, proportion, size, shape, weight and other details of construction, within the scope of our invention may be resorted to without departing from the spirit or broad principles of our invention and without sacrificing any of the advantages thereof; and it is also understood that the drawings are to be interpreted as being illustrative and not restrictive.

One practical embodiment of the invention as illustrated in the drawings comprises:

A boxlike housing 1, of sheet metal or the like, having a door 2, and mounted upon a plurality of caster wheels 3. The metal of the top of said housing is extended upwardly to form a hollow standard 4 which has an open bottom 5 and open top 6. A vertically adjustable sleeve 7 descends from the base 8 of the water tank 9 thereabove and slidably envelopes partially the said standard 4. A positioning means 10 such as a thumb screw or the like is provided upon the lower portion of the said sleeve 7 in such a manner as to contact the said standard 4 and maintain said sleeve 7 in a desired position thereupon.

The water tank 9, rigidly secured in a leakproof manner to the said base 8, rises therefrom in such form as may be desired, and is provided with a false bottom 11 adjacent the said base, and with a removable closed top 12; said false bottom 11 is water tight and is provided adjacent one side with a threaded perforation and therein, downwardly extending, with a nipple 13. Between said false bottom 11 and said tank base 8, said nipple enters the T of a needle valve 14, which is provided with a hand control 15 external to said tank. Oppositely extending from said valve 14 through the space between the false bottom and the tank base and thence slightly through the side wall of the said tank adjacent said base 8, is the water tube 16. Said tube 16 at its extending open end 17 enters the water trap 18, external to said tank 9, and like said tank, disposed in a water tight manner upon the said base 8. Said trap is designed to hold a small quantity of water and has an open top. Said trap 18 and tank 9 are connected only through the said tube 16.

Within the said housing, 1 and rigidly secured to its floor 21, is a small air compressor 22 of known make operatively connected to a usual, driving electric motor 23. The latter is connected by usual means not shown to a source of current supply.

From the said compressor 22, a flexible tube 25 leads upwardly through the said standard 4, the sleeve 7 and the base 8 where it connects in a leak proof manner with a metal nipple 20. Said nipple enters the trap 18 at an upward angle through the side wall of the said tank 9, through a perforation in the latter below the said false bottom 11. Within the trap 18 said nipple is capped with a jet nozzle 26, the tip of which is slightly below the level of the side walls of said trap.

In operation our portable spray will be positioned as desired adjacent a vegetable rack or the like. The thumb screw 10 will be loosened and the tank 9 raised or lowered to the desired height. Screw 10 will then be tightened. The tank 9 will be supplied with water and the needle valve 14 will be opened by the control 15, permitting the water trap 18 to fill to a level very slightly above the orifice of the air jet nozzle 26. Current will be applied to the motor 24. Compressor 22 will force a column of air through the tube 25 and jet nozzle 26. The air pressure thus delivered will forcibly propel small quantities of water broken up into a fine vaporized mist like spray upwardly and outwardly in the direction of the flowing column of air, to cool and moisten the products upon the adjacent rack.

The flow of water from tank 9, necessary to retain the desired level in water trap 18, will be regulated by the needle valve 14 previously described.

Because of the extreme fineness of the spray developed by our device, much of the mist will be absorbed by the adjacent atmosphere, thereby cooling same to a marked degree. The residue will be deposited upon the vegetables or fruits upon the usual rack and same will be cooled and moistened, rather than water soaked. Being so cooled and moistened such products retain their freshness much longer than when merely drenched.

Figure 2 illustrates our nozzle 26 within a trap 18 which is provided with a means such as the perforation shown at 27 for suspension. The drip from a water pipe 28 is permitted to fall into the said trap 18 and the tank 9 is thus eliminated. In this embodiment the motor and compressor are positioned at a convenient point not shown.

Obviously, the invention is susceptible of embodiment in forms other than that which is illustrated in the accompanying drawings and described herein, and applicable, for the uses and purposes other than as detailed, and we therefore consider as our own all such modifications and adaptations and other uses of the form of the device herein described as fairly fall within the scope of our invention.

Having thus described our invention, what is claimed and desired to be secured by Letters Patent, is:

1. A device as described, embodying a hollow, wheeled base member having a hollow upstanding portion, a liquid supply tank having a hollow downstanding portion, said upstanding and said downstanding portions telescoping and relatively adjustable vertically, an open topped container exterior to and integral with said tank and connected thereto by a first tube, an air nozzle disposed at an upward angle through a wall of said container, said nozzle connected by a second tube within said upstanding and said downstanding portions to an air supply within said base member, said first tube having a valve for regulating the flow of said liquid from said tank to said container and for maintaining the level of said liquid in said container at a point slightly above the tip of said nozzle.

2. A spray, as described, in combination, a hollow, wheeled base member having a hollow upstanding portion, a liquid supply tank having a hollow downstanding portion, said upstanding and said downstanding portions telescoping and relatively adjustable vertically, an open topped container exterior to and integral with said tank and connected thereto by a first tube, an air nozzle disposed at an upward angle through a wall of said container, said nozzle connected by a second tube within said upstanding and said downstanding portions to an air supply within said base member, said first tube having a valve for regulating the flow of said liquid from said tank to said container and for maintaining the level of said liquid in said container at a point slightly above the tip of said nozzle.

3. In a spray, the combination with a wheeled base member housing a motor and an air compressor, of a hollow upstanding portion integral with said base member, a liquid supply tank having a hollow downstanding portion, said upstanding and said downstanding portions telescoping and relatively adjustable vertically, an open topped container exterior to and integral with said tank and connected thereto by a first tube, an air nozzle disposed at an upward angle through a wall of said container, said nozzle connected to said air compressor by a second tube extending through said upstanding and said downstanding portions, said first tube having a needle valve for regulating the flow of said liquid from said tank to said container and for maintaining the level of said liquid at a point in said container slightly above the tip of said nozzle.

4. An atomizer for cooling vegetables and the like, having in combination, a vessel having its entire top open, an air nozzle rigidly disposed at an upward angle within said vessel, means for supplying air under pressure to said nozzle, and means for supplying a liquid to said vessel and maintaining said liquid at a level slightly above the tip of said nozzle.

5. In an atomizer for cooling vegetables and the like, the combination with a water containing vessel having its entire top open, of an air nozzle disposed in said vessel at an oblique angle to and with its tip slightly beneath the surface of said water.

6. In an atomizer for cooling vegetables and the like, the combination with a water containing vessel having its entire top open, of an air nozzle disposed in said vessel at an oblique angle to and with its tip slightly beneath the surface of said water, said nozzle adapted to form a mist of said water, and to force said mist outwardly over the edge of said vessel.

7. In an atomizer for cooling vegetables and the like, the combination of a water containing vessel having its entire top open, with an air nozzle disposed in said vessel with its tip slightly below and at an angle to the surface of the water.

8. In an atomizer for cooling vegetables and the like, the combination of a water containing vessel having its entire top open, and an air nozzle disposed in said vessel with its tip slightly below and at an upwardly inclined angle to the surface of the water.

9. In an atomizer for cooling vegetables and the like, the combination of a water containing vessel having its entire top open, an air nozzle disposed in said vessel with its tip slightly below and at an upwardly inclined angle to the surface of the water, means for supplying water to said vessel, and means for maintaining the water at a desired depth within said vessel.

10. In an atomizer for cooling vegetables and the like, the combination of a water containing vessel having its entire top open, an air nozzle disposed in said vessel with its tip slightly below and at an upwardly inclined angle to the surface of the water, means for supplying water to said vessel, means for maintaining the water at a desired depth within said vessel, and means for supplying compressed air to said nozzle.

LOYS C. POTTS.
OLIVER P. ROMINE.